US012409540B2

(12) United States Patent
Subhash et al.

(10) Patent No.: US 12,409,540 B2
(45) Date of Patent: Sep. 9, 2025

(54) COMPACT MECHANICAL WAVEGUIDES FOR IMPACT DEVICES

(71) Applicants: University of Florida Research Foundation, Inc.; Mississippi State University, Starkville, MS (US)

(72) Inventors: Ghatu Subhash, Gainesville, FL (US); Wilburn Whittington, Starkville, MS (US)

(73) Assignee: University of Florida Research Foundation, INC., Gainesville, FL (US)

( * ) Notice: Subject to any disclaimer, the term of this patent is extended or adjusted under 35 U.S.C. 154(b) by 0 days.

(21) Appl. No.: 18/716,598

(22) PCT Filed: Dec. 2, 2022

(86) PCT No.: PCT/US2022/080829
§ 371 (c)(1),
(2) Date: Jun. 5, 2024

(87) PCT Pub. No.: WO2023/114647
PCT Pub. Date: Jun. 22, 2023

(65) Prior Publication Data

US 2025/0050487 A1 Feb. 13, 2025

Related U.S. Application Data

(60) Provisional application No. 63/265,592, filed on Dec. 17, 2021.

(51) Int. Cl.
*B25D 9/02* (2006.01)

(52) U.S. Cl.
CPC .................................... *B25D 9/02* (2013.01)

(58) Field of Classification Search
CPC .......... E21C 37/26; B25D 17/02; E21B 10/36
See application file for complete search history.

(56) References Cited

U.S. PATENT DOCUMENTS

| | | | | |
|---|---|---|---|---|
| 9,074,422 | B2 * | 7/2015 | Grubb | B23K 26/1464 |
| 2008/0052889 | A1 | 3/2008 | Atkins et al. | |
| 2013/0126199 | A1 | 5/2013 | Giraldo et al. | |

FOREIGN PATENT DOCUMENTS

| | | | |
|---|---|---|---|
| WO | 2019190381 | A1 | 10/2019 |

OTHER PUBLICATIONS

International Search Report and Written Opinion Received for WO Publication PCT/US22/80829.

* cited by examiner

*Primary Examiner* — Nathaniel C Chukwurah
(74) *Attorney, Agent, or Firm* — Thomas | Horstemeyer LLP.

(57) ABSTRACT

The present disclosure relates to compact waveguide impact devices. One example includes a branching compact mechanical waveguide that has at least one input impact location and at least one input impact location output impact point. The compact waveguide impact device also includes at least one input impact component. A controller device activates the at least one input impact component to strike the at least one input impact location according to an input impact pattern, thereby producing a desired output impact pattern.

15 Claims, 10 Drawing Sheets

COMPACT MECHANICAL WAVEGUIDES FOR IMPACT DEVICES

CROSS-REFERENCE TO RELATED APPLICATIONS

This application is the 35 U.S.C. § 371 national stage application of PCT Application No. PCT/US2022/080829, filed Dec. 2, 2022 which claims priority to co-pending U.S. provisional application entitled, "COMPACT MECHANICAL WAVEGUIDES FOR IMPACT DEVICES," having Ser. No. 63/265,592, filed Dec. 17, 2021, the disclosures of which are incorporated herein in by reference in their entireties, by reference.

TECHNICAL FIELD

The present disclosure is generally related to techniques for mechanical impact tools and devices.

BACKGROUND

In mechanical impact tools and devices, utilizing an appropriate impact force, force distribution, and duration can be important. For example, the stress-strain response and size of a material or object being impacted, as well as surrounding objects and structures including earth can affect the selection of impact force, force distribution, and duration.

In some cases, the impact device can be completely ineffective if the maximum force generated is too low. On the other hand, using too much force can cause unnecessary strain and potentially damage to construction materials or their surroundings.

In addition, the size requirement for many impact devices can be great, increasing energy requirements, fatigue, and cost of production. Selecting a smaller size impact device can reduce the force that can be applied. Selecting a larger size impact device can increase force but cause the device to be inapplicable for some applications where higher force can cause damage.

As a result, there is a need for better solutions for impact devices that can provide greater force with smaller size devices, as well as for impact devices that provide greater variability in impact force, impact distribution, and impact duration.

SUMMARY

Embodiments of the present disclosure provide mechanisms that utilize a branching compact mechanical waveguide for impact tools. One example includes a compact waveguide impact device. One or more input impact component impacts a branching compact mechanical waveguide of the device. The branching compact mechanical waveguide includes one or more input impact location and one or more output impact point. The one or more output impact point is different from the one or more input impact location. A controller device activates the One or more input impact component to impact the one or more input impact location of the branching compact mechanical waveguide according to an input impact pattern. The one or more input impact location produces an output impact pattern at the one or more output impact point.

In some examples, one or more input impact location includes input or impact locations on opposite sides of the branching compact mechanical waveguide. In some examples, a single input impact component strikes multiple input impact locations of the at least one input impact location. In some examples, a waveguide transmission component includes a plurality of different branching compact mechanical waveguides including the branching compact mechanical waveguide previously referred to. In some examples, the waveguide transmission is a manual waveguide transmission that enables manual movement of the branching compact mechanical waveguide into place. In some examples, the waveguide transmission is an automatic waveguide transmission and the controller device selects the branching compact mechanical waveguide based on the output impact pattern and activates a component of the compact waveguide impact device to move the branching compact mechanical waveguide into place in the compact waveguide impact device. In some examples, the device includes a serviceable mechanism that enables installation, removal, and replacement of the branching compact mechanical waveguide to the compact waveguide impact device.

Further examples include a method of impacting a branching compact mechanical waveguide that includes at least one input impact location and at least one output impact point that is different from the at least one input impact location. The method also includes activating, by a controller component, the at least one input impact component to impact the at least one input impact location of the branching compact mechanical waveguide according to an input impact pattern. Impacting the at least one input impact location produces an output impact pattern at the at least one output impact point.

In some examples, the at least one input impact location includes input impact locations on opposite sides of the branching compact mechanical waveguide. In some examples, a single one of the at least one input impact component strikes a plurality of input impact locations of the at least one input impact location. In some examples, the branching compact mechanical waveguide is moved into place using a waveguide transmission comprising a plurality of branching compact mechanical waveguides including the branching compact mechanical waveguide. In some examples, the waveguide transmission is a manual waveguide transmission that enables manual movement of the branching compact mechanical waveguide into place. In some examples, the method also includes selecting, by the controller component, the branching compact mechanical waveguide based on the output impact pattern that is desired, so that the waveguide transmission is an automatic waveguide transmission. In some examples the method includes activating, by the controller component, a component of the compact waveguide impact device to move the branching compact mechanical waveguide into place in the compact waveguide impact device. In some examples, the method includes installing, removing, or replacing the branching compact mechanical waveguide in the compact waveguide impact device using a serviceable mechanism that enables access to a waveguide holder of the compact waveguide impact device.

BRIEF DESCRIPTION OF THE DRAWINGS

Many aspects of the present disclosure are better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
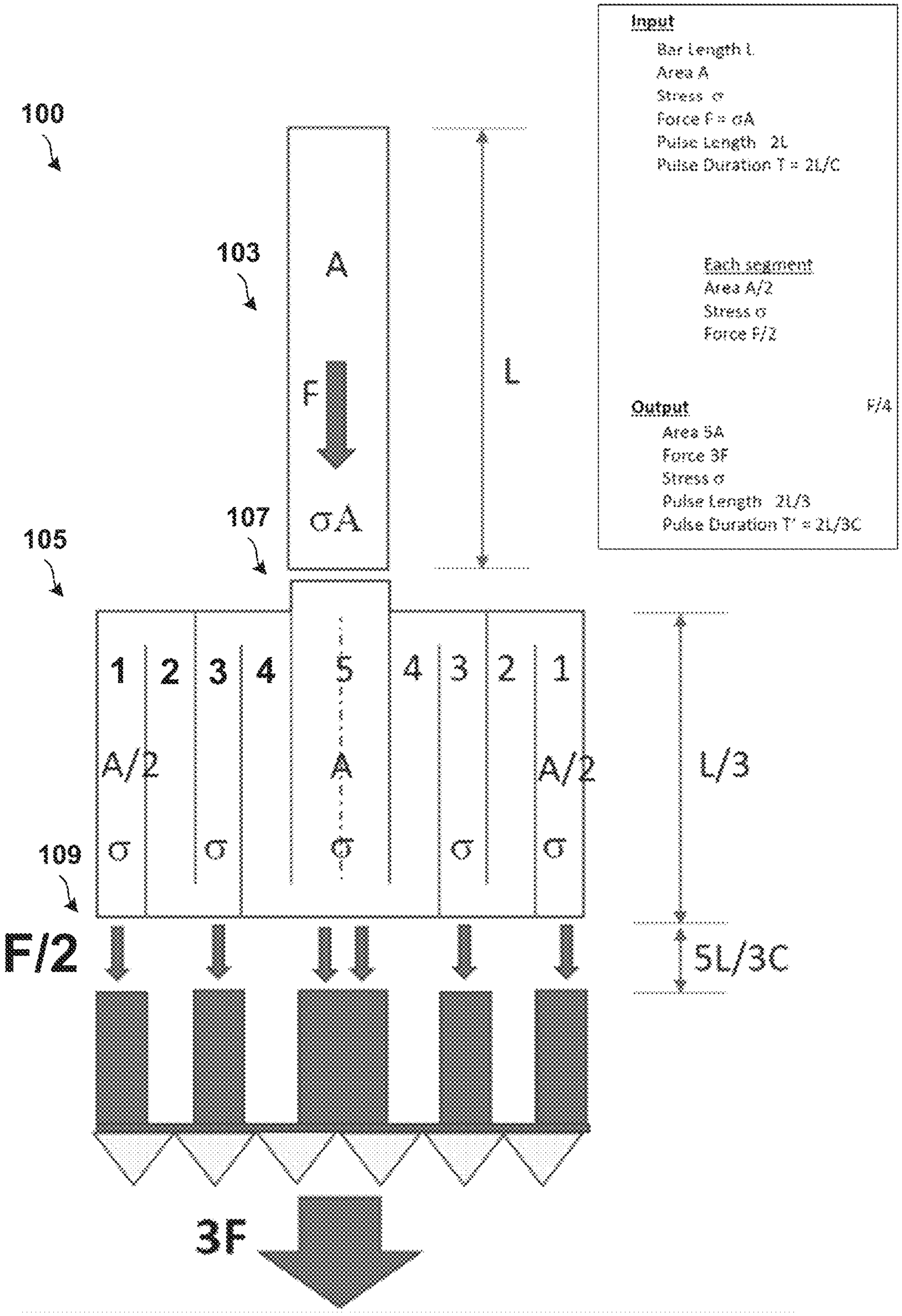
FIG. 1 illustrates an example compact mechanical waveguide impact device, according to the present disclosure.

The present disclosure relates to compact mechanical waveguide impact devices. Mechanical impact devices can produce impacts according to a set of output impact parameters. Impact force, force distribution, and duration can be important. An impact device can be ineffective if the maximum force generated is too low. On the other hand, using too much force can cause unnecessary strain and potentially damage to construction materials or their surroundings. The size requirement for standard impact devices can be great, which can increase energy requirements, fatigue, and cost of production. Selecting a smaller size traditional impact device can reduce the force that can be applied. Selecting a larger size traditional impact device can increase force but cause the device to be inapplicable for some applications where higher force can cause damage. As a result, there is a need for better solutions for impact devices that can provide greater force with smaller size devices, as well as for impact devices that provide greater variability in impact force, impact distribution, and impact duration.

The present disclosure describes mechanisms and control schemes for compact mechanical waveguide impact devices. The various compact mechanical waveguide impact devices described can include a compact mechanical waveguide with multiple impact locations, including one or more input impact locations and one or more output impact locations.

In some examples, a compact mechanical waveguide with a single input impact location can include multiple output impact locations dispersed over a larger area. In some examples, a compact mechanical waveguide with multiple input impact locations can include a single output impact location. Other examples can include multiple input impact locations and multiple output impact locations.

An input impact from an input impact component can strike one or more input impact locations to generate one or more corresponding 1-D stress waves that propagate through the rods or beams of a compact mechanical waveguide of a compact mechanical waveguide impact device. In various embodiments, the stress waves can propagate to generate one or more impacts at one or more output impact locations. The stress waves can combine to magnify the force of an output impact, and can distribute force over a greater area. In some cases, the duration of the impact can be decreased if the force is magnified and/or distributed over a greater area.

The compact waveguide technologies described herein can output a greater impacting force using a much smaller form factor than existing technologies. The present disclosure also enables a single compact mechanical waveguide impact device to be configured to provide a wide range of different output impact patterns that would traditionally require larger devices as well as multiple different devices to generate.

A folded-bar design of a compact mechanical waveguide can be used to accommodate any length incident stress wave into a compact waveguide form. A compact waveguide impact device can include a waveguide that has an acoustic length that is at least an integer multiple (e.g., >2) of its physical length, such as an acoustic length that is more than twice its physical length, and far greater.

The folded-bar design itself can be referred to as a "Millipede Hopkinson Bar", or "multidimensional Hopkinson Bar" because the device can have any number of folds in multiple dimensions to accommodate a long stress wave thus achieving the desired acoustic length and wave propagation properties in order to generate a desired output impact pattern. Depending on the area of cross section and length of each bar this design can be accommodated in a small area. In some cases, for each length of bar of the folded bar, its length can be greater than its width. For example, a length to width (L/W) or length to diameter ratio (L/D) can be greater than one, greater than or equal to two, greater than or equal to five, greater than or equal to ten, and greater than or equal to twenty and can be chosen depending on design parameters to obtain one dimensional stress wave propagation characteristics.

The folded bar design can use lengths of bars in multiple dimensions. The lengths of bars can be parallel lengths of a bar connected using branches and/or corners. A controller device can control one or more input impact components to apply impacts to one or more input impact locations that impart 1D stress waves that propagate through the folder bars. The stress waves can cause the compact mechanical waveguide impact device to produce the desired output impact pattern at one or more output impact locations of the device. In the various embodiments, a compact mechanical waveguide impact device can include a waveguide transmission component that includes one or more compact mechanical waveguides that can be rotated, slid, or otherwise moved into place. Some devices can include a replaceable and serviceable compact mechanical waveguide. The compact mechanical waveguide impact devices can include impact or percussive drilling devices, pile driving devices, material testing devices, jackhammer and other demolition devices, and other types of impact devices. The mechanical waveguide impact devices can also include components of a larger device such as a force magnification and/or force distribution component of a percussive drill, jackhammer tool for a tractor, piling driving tool for a crane, and other components. The relatively small size of these mechanical waveguide impact devices can enable easy replacement, and some tools can provide a linear, rotary, or another type of mechanical waveguide transmission that includes multiple different waveguides. The overall device can select and automatically move, or enable manual movement, of a particular mechanical waveguide into place for a desired application or purpose.

FIG. 1 shows components of a compact mechanical waveguide impact device 100. The compact mechanical waveguide impact device 100 can include an input impact component 103, and a branching mechanical waveguide 105. The input impact component 103 can impact an input impact location 107 of the branching mechanical waveguide 105. This can generate a 1D stress wave that propagates through the branching mechanical waveguide 105 over time. The 1D stress wave can cause the branching mechanical waveguide 105 to produce impacts at multiple output impact locations 109.

In this example, the input impact component 103 can have a length L, and can strike the input impact location 107 of the branching mechanical waveguide 105 with a force F corresponding to stress σ times cross sectional area A of the input impact component 103. In other words, the input parameters can include bar length L, area A, stress σ, input force F=σA, pulse length 2L, and pulse duration T=2L/C.

The input impact location 107 of the branching mechanical waveguide 105 can have the same area A and stress σ. The branching mechanical waveguide 105 can include a primary or center bar (5) that branches symmetrically into two branch bars (4) along a single axis. Any number of branches can be made, provided the sum of the branch impedances of the branch bars (4) at the branching point is equivalent to the impedance of the center bar (5). Each of the branch bars (4) can be folded at a branching point, with the branch extension bars (3), (2), and (1) in this example being extensions of the branch bars (4) at the folding points. However, in other examples, the branch bars (4) can themselves be branched again, and in any direction, provided that the sum of sub-branch impedances of sub-branch bars from a particular branch bar (4) is equivalent to the impedance of that branch bar (4).

Each branch can include a series of bars (4), (3), (2), and (1), which can be symmetrical with a series of bars (4), (3), (2), and (1) of the other branch, and can have a serpentine shape connected using connection joints or connection points at alternating ends. Connection joints can also be described as junctions, and can include 180 degree junctions. This can result in a two-dimensional branching mechanical waveguide 105 that includes bars or lengths that are symmetrical about one plane of symmetry. Each bar in the series can be noncollinear and nonconcentric with the center bar (5). Each bar can be parallel to the center bar (5). Each of the bars can have a length to width ratio chosen to obtain one dimensional stress wave propagation characteristics.

A sum of the impedances of the mirrored branches from the center bar (5) can be equivalent to an impedance of the center bar (5). This branch impedance matching can be achieved in a number of manners. For example, where a single material is used for the center bar (5) and all branches, the sum of the cross sectional areas of the branches can match a cross-sectional area of the center bar (5). As can be seen, the center bar (5) branches into the bars (4). When the primary or center bar (5) impacts, or is impacted, at a proximal end to an input impact point or location 107, a wave propagating in the center bar (5) branches into bars (4) and on to the bars (3), (2), (1) in each branch from the input impact point 107, and out to the output impact points or locations 109.

The distal end of the center bar (5) can branch into the two branch bars (4) using a branching connection point or branching point. The branching point can be attached to the center bar (5) and the bars (4) by welding, mechanical fit, bonding materials such as glue or epoxy, screwed connection, threaded connection, press fit, forging, frictional welding, and/or any other mechanical connection. In some cases, the center bar (5), the bars (4), and the branching point can be part of a singular object rather than multiple components, such as a 3D printed object, a molded object, or another singular object along with the other bars of the branching mechanical waveguide 105.

The bar (4) can be attached to the bar (3) by a connection point or folding point that is attached by welding, mechanical fit, bonding materials such as glue or epoxy, screwed connection, threaded connection, press fit, forging, frictional welding, any other mechanical connection, or can be part of a single object. Since no branching occurs at this connection point, the bar (4) can have a same impedance as the bar (3), as well as a same cross-sectional area if the materials are the same. The other connection points in the upper and lower branches can also be described in this manner, as can be understood.

Since the branching mechanical waveguide 105 can be manufactured out of flat (e.g., square rectangular cross section) bars, the boundary conditions at the connection points can be optimized to increase performance. However, the branching mechanical waveguide 105 can be manufactured out of bars having any cross-sectional shape, such as circular, triangular, rectangular, pentagonal, hexagonal, and so on. Ideal boundary conditions can include fixing the bottoms (and/or tops) of all passes in the vertical direction. Quarter symmetry can be assumed. Some systems and implementations can include the shown lubricated or unlubricated roller bearings to ensure a stiff boundary that minimizes or reduces frictional losses as the wave passes through each connection point and each pass. Roller bearings can be included on each pass or bar, as well as along square or rounded connection points, in order to minimize frictional losses as well as to ensure uniaxial motion (along the length) of the particles during the wave propagation. Some implementations can include lubricated shims (e.g., using lubricating powder) to reduce frictional losses, in addition to or rather than roller bearings. As can be seen, a tool or impact device that utilizes the branching mechanical waveguide 105 can be much more compact than a standard Hopkinson bar or other traditional impact devices, while also having far greater adjustability than existing tools.

As indicated above, a single material is used, then impedance can be related to cross-sectional area. In the instant example, the center bar (5) can have cross sectional area A, and the branch bars (4), as well as the branch extension bars (3), (2), and (1) that extend the branches at various folding points can each have an area A/2. In other words, each segment (4), (3), (2), (1), can have area A/2, stress σ, and force F/2 based on the geometry of this non-limiting implementation.

The branching mechanical waveguide 105 can produce impacts at multiple output impact locations 109, corresponding to an output impact location 109 of the center bar (5), and output impact locations 109 of the segments (1) and (3). Since the stress wave at segments (4) and (2) is propagating away from the direction of impact, these segments impart no force or impact to the impact target(s).

Since the stress in each of the segments (3) is σ, and the cross sectional area of each of the segments (3) is A/2, and F=σA the force imparted by each of the segments (1) and (3)

can be F/2. The force imparted by the center bar (5) can be F. Each arrow in the image represents a force of F/2. As a result, the total force is magnified to 3F. However, the output pulse length can be reduced to 2L/3, and the pulse duration can be reduced to 2L/3C. In other words, the compact mechanical waveguide impact device 100 in this example can magnify force while reducing duration. This can enable smaller tools to perform a 'larger' job that requires greater force, even if the time taken to complete the job is longer than a larger tool.

Figure 2:
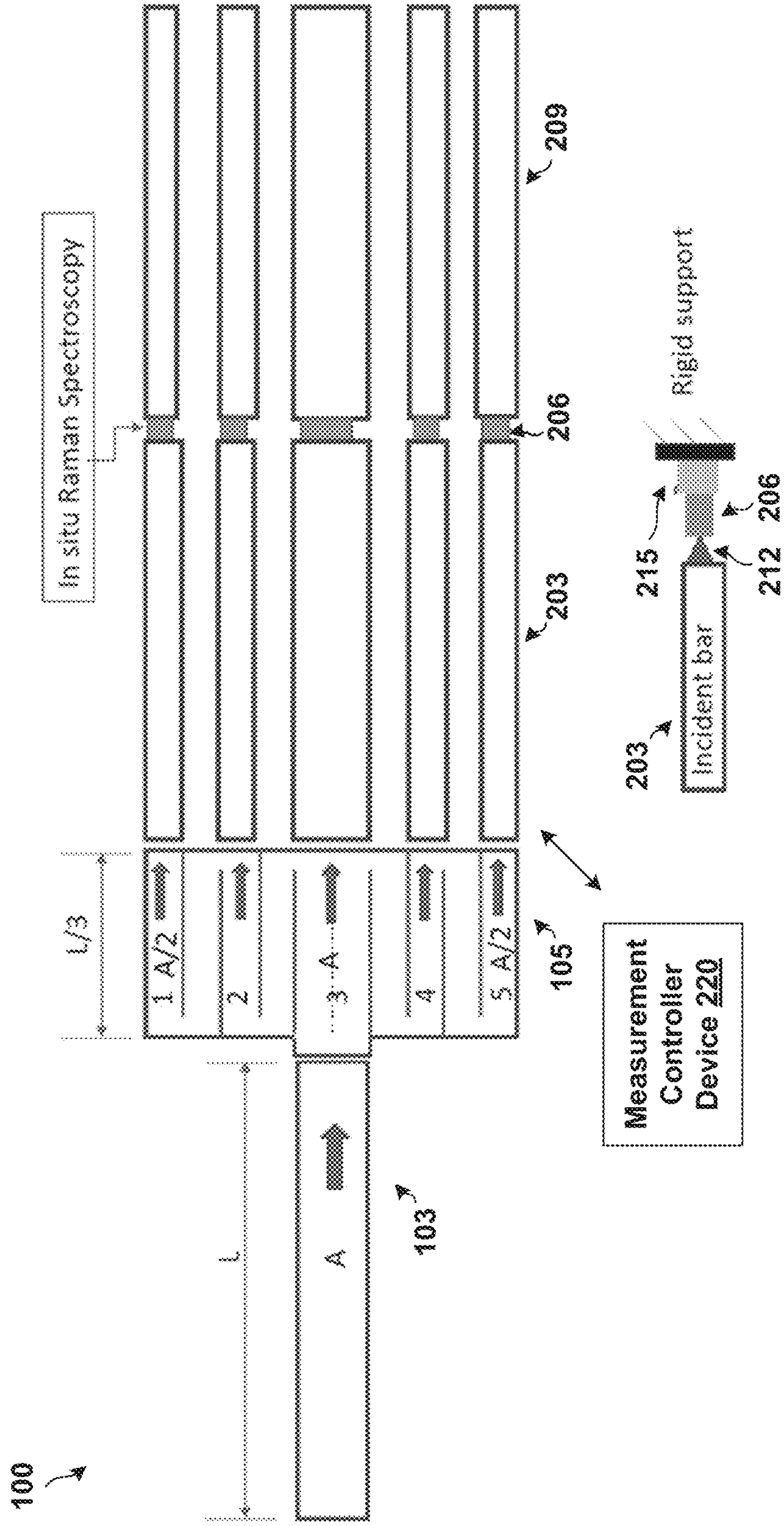
FIG. 2 illustrates an example of using a compact mechanical waveguide impact device to impact multiple incident bars for testing and measurement, according to the present disclosure.

FIG. 2 shows an example that uses a compact mechanical waveguide impact device 100 to impact multiple incident bars 203 for testing and measurement purposes. The specimen 206 can be provided between an incident bar 203 and a transmission bar 209.

Alternatively, each incident bar 203 can include or be connected to an indenter 212, which impacts the specimen 206. In this example, the indenter 212 can impact the specimen 206. The specimen 206 can be held against a load cell 215 against a rigid support.

A measurement controller device 220 can cause the compact mechanical waveguide impact device 100 to impact multiple incident bars 203. For example, the measurement controller device 220 can motivate or actuate an input impact component 103 to strike the branching mechanical waveguide 105. The branching mechanical waveguide 105 can receive the force of the impact at an input impact location and output multiple impacts at output impact locations. As a result, the single impact can be used to perform multiple tests in a shorter amount of time. In addition, the compact mechanical waveguide impact device 100 can be smaller than a single standard impacting device.

The measurement controller device 220 can detect and monitor the effects of a waveform propagating in the incident bar 203 and/or the transmission bar 209 in various embodiments. A sensor device can measure the effects of the waveform, and provide waveform parameters to the measurement controller device 220 over time.

The measurement controller device 220 can map the waveform parameters to a measurement. For example, an analysis of the timing and magnitude of the waveform over time can be correlated to a particular measurement or measured value. The analysis can include comparing the waveform parameters to a table or another data structure that identifies the measurement. The analysis can also include providing the waveform parameters or values as inputs to an algorithm that identifies the desired measurement.

The measurement controller device 220 can provide an indication of the measurement. For example, the measurement controller device can cause a display of the tool to show the measurement. The measurement controller device 220 can cause the tool to generate a sound, or a sound of a particular tone that indicates a particular measurement. The measurement controller device 220 can cause the tool to illuminate a light that is correlated to a particular measurement. The measurement controller device can also include a physical or wireless electronic connection through which the tool can transmit or otherwise provide an indication of the measurement.

Figure 3:
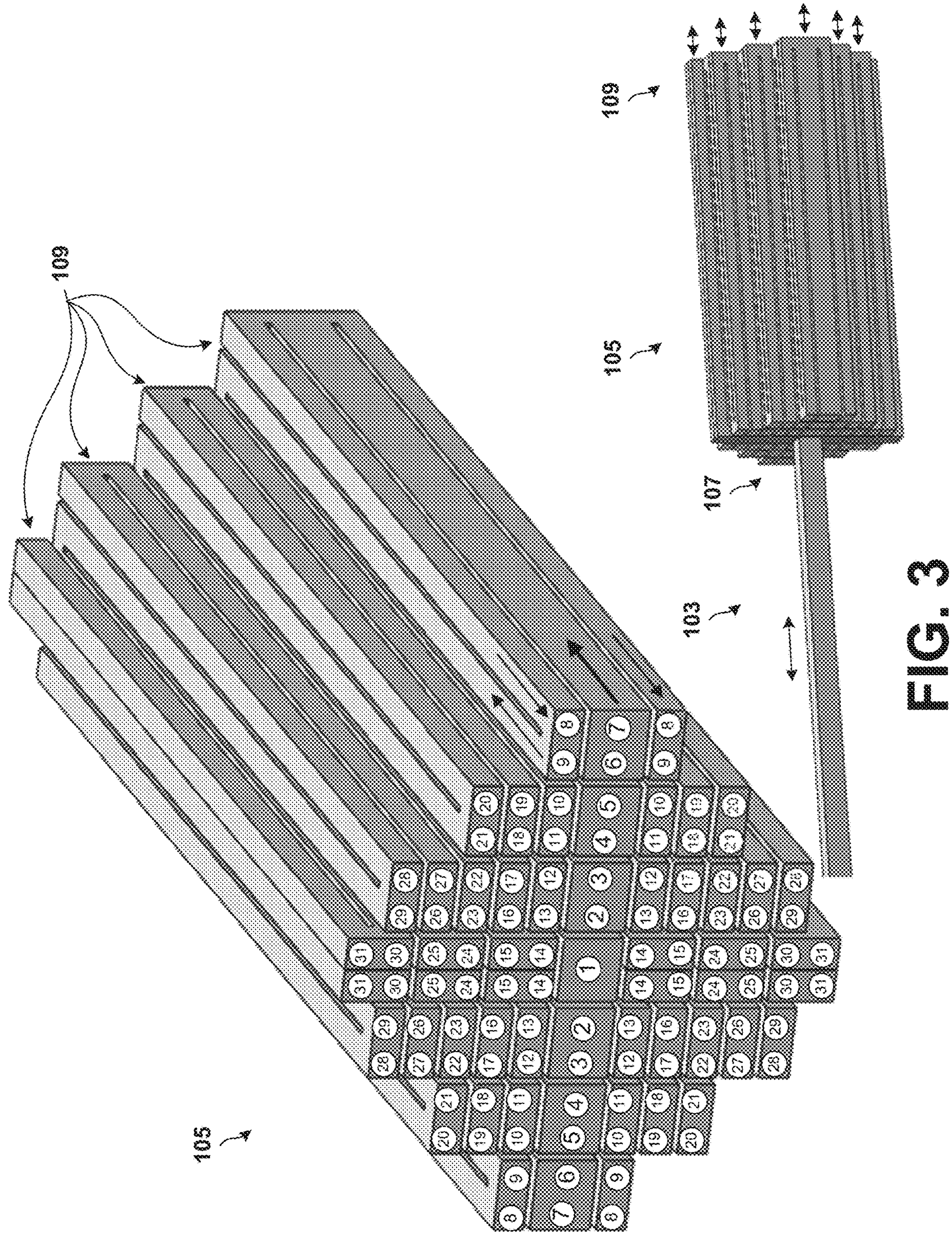
FIG. 3 illustrates another example compact mechanical waveguide impact device, according to the present disclosure.

FIG. 3 shows a multi-dimensional branching mechanical waveguide 105. The multi-dimensional branching mechanical waveguide 105 is multi-dimensional, or three dimensional, in that it includes bars or lengths that are symmetrical about two planes of symmetry and extend in a third dimension. The planes of symmetry can be perpendicular to each other.

The compact mechanical waveguide can also include a multi-dimensional symmetrical branching and impedance-matched series of bars that branch a center bar along a first plane of symmetry at a branching point. The sum of the impedances (and cross-sectional areas where a single material is used throughout) of the mirrored branches and (e.g., left and right branches in the orientation shown) from the center bar can be equivalent to the impedance (and a cross-sectional area where a single material is used throughout) of the center bar. The serpentine shape can include a number of lengths that are aligned perpendicular with the center bar on a second plane of symmetry that is perpendicular to the first plane of symmetry. In some examples, each of the mirrored branches can include a noncollinear, nonconcentric serpentine shape that is noncollinear and nonconcentric with respect to the center bar.

Each of the mirrored branches can itself branch into two mirrored sub-branches mirrored about another plane of symmetry. The sum of the impedances of the mirrored sub-branches can be equivalent to the impedance of a single one of the mirrored branches from the center bar. For the purpose of illustration, a branching point can branch vertically into two mirrored serpentine sub-branches. In some examples, each of the mirrored sub-branches can include a parallel set of bars that are noncollinear, nonconcentric serpentine shape that is noncollinear and nonconcentric with respect to the center bar. The sub-branches can include a number of lengths that are aligned perpendicular with the center bar and on at least one plane that is parallel to one or more of the first plane of symmetry, and the second plane of symmetry. The branching design of the branching mechanical waveguide 105 that is shown includes a certain number of passes but any number of passes and any number of parallel bars can be used.

The branching mechanical waveguide 105 includes 31 passes. Each of the passes is identified numerically. For example, the center bar is labelled (1) and can be considered a first "pass" or first equivalent acoustic length of the branching mechanical waveguide 105. The center bar (1) can split at a branching point at its distal end into two branch bars (2). Each set of the branch bars labelled (2)-(7) can refer to a set of two bars that can be summed up to the impedance of the center bar (1). Each of the branch bars (7) can split at a branching point into two sub-branch bars (8). Each of the sub-branch bars (8) can be half the impedance of an individual one of the branch bars (7), and a quarter of the impedance of the center bar (1). Each set of four sub-branch bars (8)-(31) can refer to a set of four bars that can be summed up to the impedance of the center bar (1). The sub-branch bars (8)-(31) can be connected using non-branching points in this example.

The branching mechanical waveguide 105 can include one or more input impact locations 107, such as at the center bar (1), as well as separate output impact locations 109 at a distal end from the input impact location 107 at the center bar (1). The branching mechanical waveguide 105 can translate force imparted at a first one or more input impact locations 107 and output force as an output impact pattern at output impact locations 109 that are different from the input impact location 107. Alternatively, the impact locations or locations labelled as input impact locations 107 can alternatively be used as output impact locations 109. In that example, the output impact locations 109 can receive an impact as an input impact location 107.

Further embodiments can provide inputs at the center bar any while output is provided using faces at the end of branches on one or more sides including input/output impact locations labelled 107 and 109. Further embodiments can provide inputs using faces at the end of branches on one or more sides including input/output impact locations labelled 107 and 109, while the center bar is used as an output impact location. While a particular three dimensional shape is shown with same-length bars, differing length bars can also be provided as shown in the two dimensional shapes in other figures.

Figure 4:
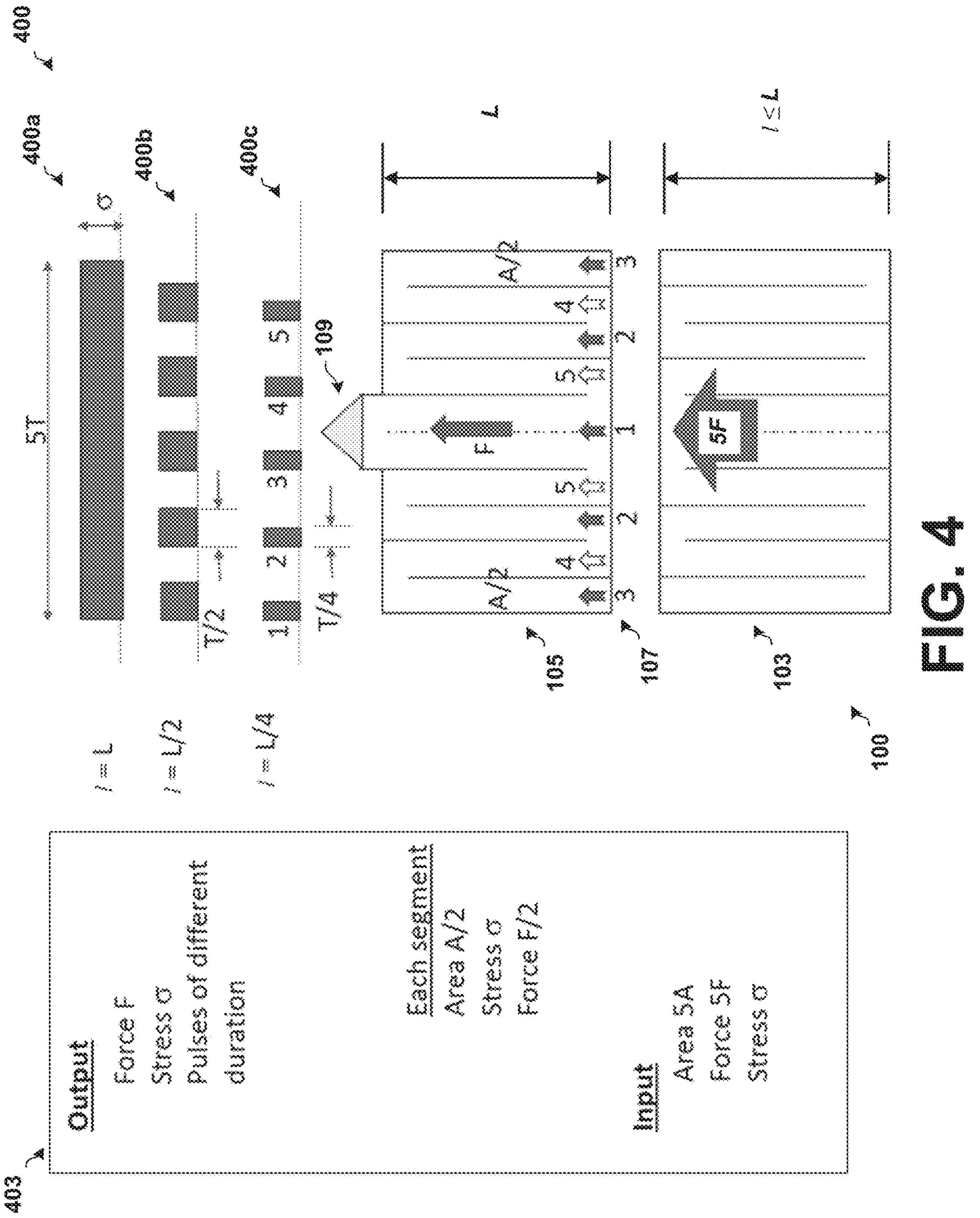
FIG. 4 illustrates an example of using a compact mechanical waveguide impact device to generate an output impact pattern, according to the present disclosure.

FIG. 4 shows a compact mechanical waveguide impact device 100 that generates various output impact patterns 400. The compact mechanical waveguide impact device 100 includes an input impact component 103, a branching mechanical waveguide 105, input impact locations 107 and an output impact point 109. The input impact component 103 can be a solid component, or can be a compact mechanical waveguide. In any case, here the force provided by the input impact component 103 can be 5F.

The geometry of the various components of the compact mechanical waveguide impact device 100 can affect the output impact patterns 400. This figure shows how changing or selecting the length of an input impact component 103, the length of the branching mechanical waveguide 105, and the ratio between the lengths of these components can affect the output impact patterns 400. The compact mechanical waveguide impact device 100 can include a controller device that causes the output impact point 109 of the branching mechanical waveguide 105 to impact a target surface according to an output impact pattern 400.

In each example shown, the input area or cross-sectional area can be 5A, while the output cross-sectional area can be A. The input force can be 5F, while the output force is F. Accordingly, the ratio of input force to output force is proportional to the ratio of input area to output area.

Stress waves caused by the input impact(s) propagate through the branching mechanical waveguide 105 over time. As a result, the output pulse duration (and overall output impact pattern 400) can be affected by the lengths of individual segments of the branching mechanical waveguide 105, and the total acoustic length of the branching mechanical waveguide 105. An output impact pattern 400*a* can be an output in an example where the length l of the input impact component is the same as a length L of the bars of the branching mechanical waveguide 105. In this example, the input pulse duration can be T, and the output pulse duration can be 5T. This can result as the stress waves propagate through the branching mechanical waveguide 105 over time. First, the stress wave in the center bar (5) can be output to the output impact point 109. As time progresses, the stress waves from the set of branch bars (4) propagate and combine into the center bar (5) and can be output to the output impact point 109. Next, the stress waves from the set of branch bars (3) propagate and combine, and so on. In this example, the geometry of the overall system results in a relatively constant application of output force over a longer duration than the input force, but applied to a smaller output area.

In a second example, an output impact pattern 400*b* can be provided if the length l of the input impact component 103 is half the length L of the bars of the branching mechanical waveguide 105. Again, the input pulse duration can be T, and the output pulse duration can be 5T. The stress waves in the two branches all start at the same time, but propagate through the branching mechanical waveguide 105 over time. However, in the case of a shorter input impact component 103, the pulse duration is also shorter, resulting in gaps in the output impact pattern 400*b* over time. The duration of the individual output pulses of the output impact pattern 400*b* can be ½T. In other words, the output duration of individual pulses can be proportional to l/L. Similarly, an output impact pattern 400*c* can be provided if the length l of the input impact component 103 is one quarter the length L. Since the individual pulses can be proportional to l/L, the duration of the output pulses of the output impact pattern 400*c* can be ¼T.

While not shown in this figure, the length l of the input impact component 103 can also be larger than length L of the branching mechanical waveguide 105. In that situation, the stress wave duration in each of the bars can be longer, and can overlap, which can increase a magnitude of the stress where the overlap occurs. Since stress is proportional to force, this can cause the output force to be greater than F. This concept can be seen in FIGS. 5C and 5D, where certain bars of the branching mechanical waveguide 105 are shorter than the input impact component 103.

Figure 5B:
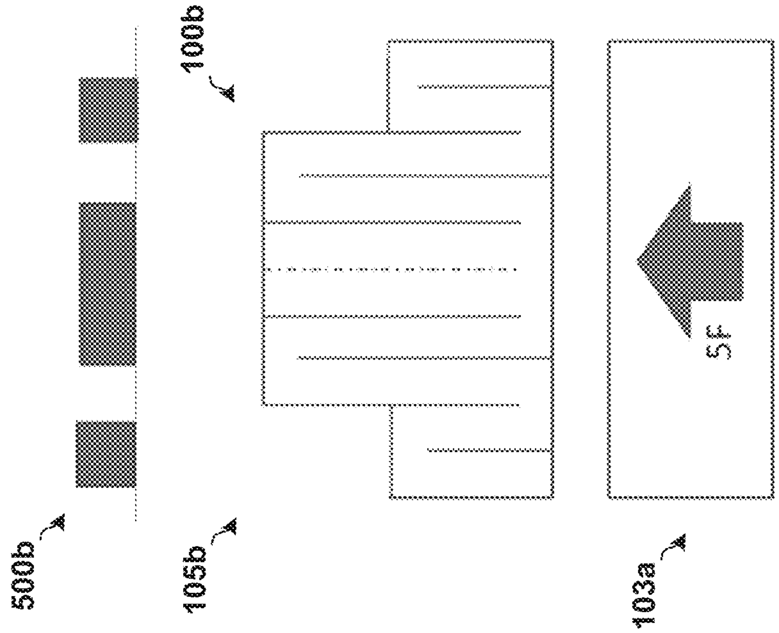
FIGS. 5A-5D illustrate examples of using various different compact mechanical waveguide impact components to generate output impact patterns, according to the present disclosure.
Figure 5A:
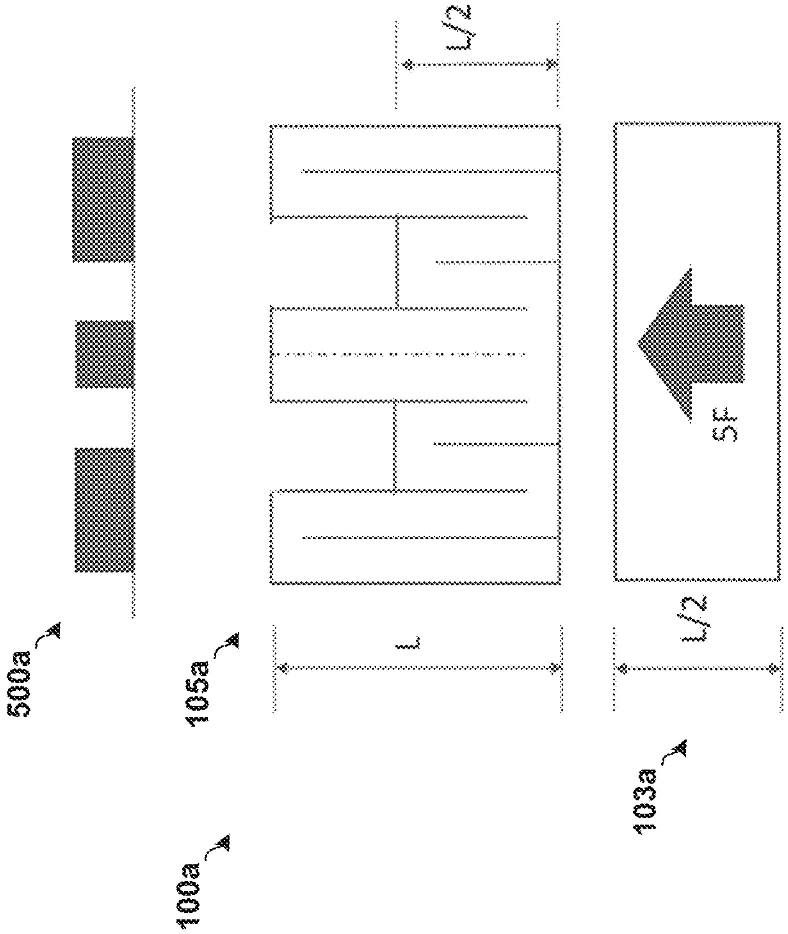
Figure 5D:
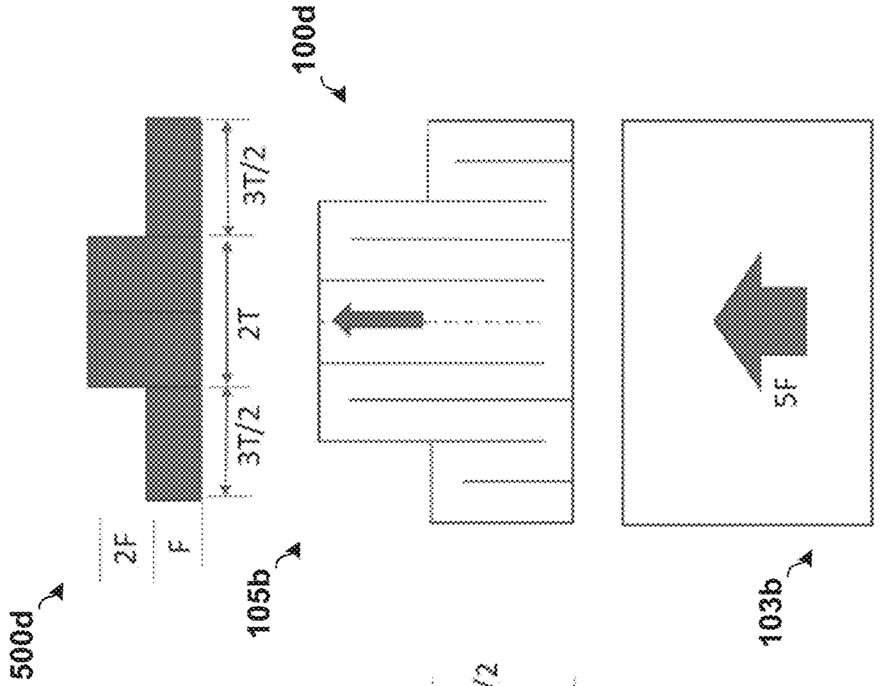
Figure 5C:
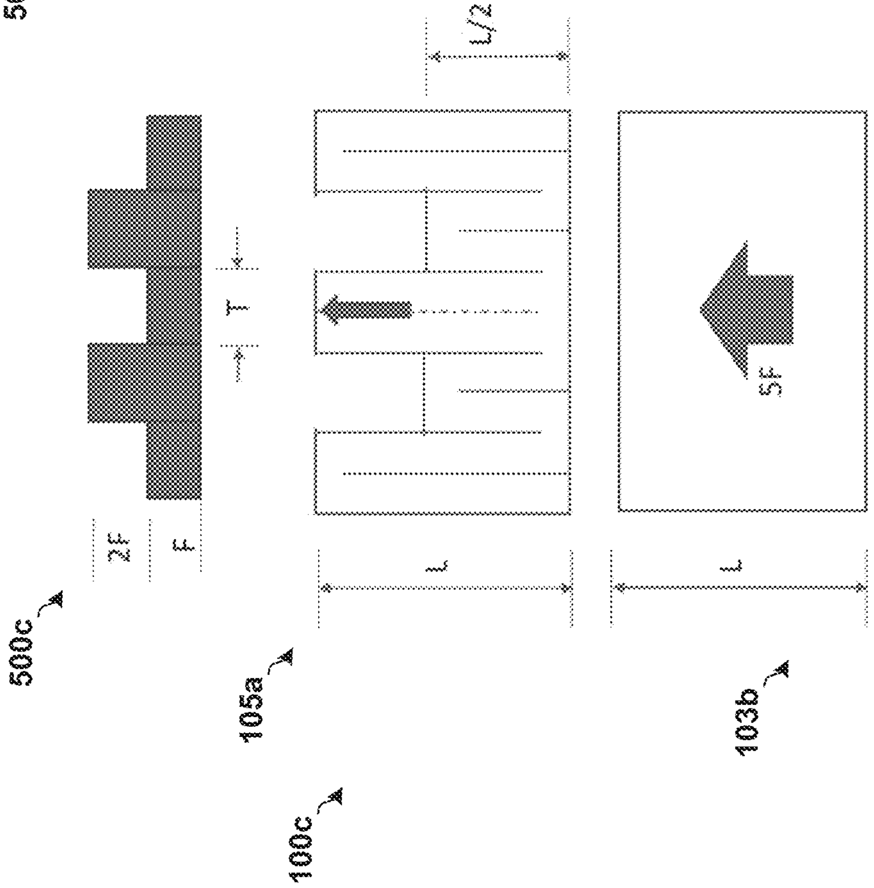

FIGS. 5A-5D show various different compact mechanical waveguide impact devices 100*a*, 100*b*, 100*c*, and 100*d*. FIGS. 5A and 5C include a compact branching mechanical waveguide 105*a*, while FIGS. 5B and 5D use a compact branching mechanical waveguide 105*a*. FIGS. 5A and 5B use a shorter input impact component 103*a*, while FIGS. 5C and 5D use a longer input impact component 103*b*. The various arrangements can be selected and utilized to generate different output impact patterns 500*a*, 500*b*, 500*c*, and 500*d*.

FIG. 5A shows a compact mechanical waveguide impact device 100*a* with a branching mechanical waveguide 105*a* and a resulting output impact pattern 500*a*. The length of the striking input impact component 103*a* can be L/2. Since some of the bars of the branching mechanical waveguide 105*a* are longer than the input impact component 103*a*, the resulting stress wave within that portion of the branching mechanical waveguide 105*a* can be shorter than those bars, resulting in blank areas or gaps in the propagating stress waves and ultimately in the output impact pattern 500*a*.

FIG. 5B shows a compact mechanical waveguide impact device 100*b* with a branching mechanical waveguide 105*b* and a resulting output impact pattern 500*b*. The length of the striking input impact component 103*a* can again be L/2. Since some of the bars of the branching mechanical waveguide 105*b* are longer than the input impact component 103*a*, the resulting stress wave within that portion of the branching mechanical waveguide 105*b* can be shorter than those bars, resulting in blank areas or gaps in the propagating stress waves and ultimately in the output impact pattern 500*b*. As can be seen, geometry of the branching mechanical waveguide 105*b* including the position of short and long bars can be selected and designed to produce a desired output impact pattern 500*b* from a known input impact size and pattern.

FIG. 5C shows a compact mechanical waveguide impact device 100*c* with the branching mechanical waveguide 105*a* (also used in FIG. 5A) and a resulting output impact pattern 500*c*. In this figure, the length of the striking input impact component 103*b* can be L. Since some of the bars of the branching mechanical waveguide 105*a* are L/2, which is shorter than the input impact component 103*b*, the resulting stress wave within that portion of the branching mechanical waveguide 105*a* can be longer than those bars, resulting in overlapping areas in the propagating stress waves and ultimately peaks in the force output in the output impact pattern 500*c* over time.

FIG. 5D shows a compact mechanical waveguide impact device 100*d* with a branching mechanical waveguide 105*b* (also used in FIG. 5B) and a resulting output impact pattern 500*d*. The length of the striking input impact component 103*b* can again be L. Since some of the bars of the branching mechanical waveguide 105*b* are shorter than the input impact component 103*b*, the resulting stress wave within that portion of the branching mechanical waveguide 105*b* can be longer than those bars, resulting in overlapping areas in the propagating stress waves and ultimately in the output impact pattern 500*d*. As can be seen, geometry of the branching mechanical waveguide 105*b* including the position of short and long bars can be selected and designed to produce a desired output impact pattern 500*d* from a known input impact size and pattern.

Generally, with references to FIGS. 5A-5D, rather than separate compact mechanical waveguide impact devices 100*a*-100*d* for each branching mechanical waveguide 105*a*-105*d*, a single mechanical waveguide impact device 100 can include any or all of the different branching mechanical waveguides 105*a*-105*d*. A controller device of the mechanical waveguide impact device 100 can control the input impact components to strike each branching mechanical waveguide 105 in multiple different ways based on input parameters. Input parameters can include the branching mechanical waveguide 105, the object that is to be impacted by the output impacting point, a maximum force, an intermediate minimum force, a frequency, and other parameters. These parameters can also be parameters corresponding to a desired output impact pattern. In some examples, the maximum force, an intermediate minimum force, a frequency, and other parameters of the output impact pattern can be identified based on target parameters of the object to be impacted and a desired action (e.g., driving, drilling, demolition, etc.). The target parameters can include a material composition and shape of the object and material composition and shape of surrounding objects. The target parameters of the object and the desired action can be considered output impact parameters.

Since the compact mechanical waveguide impact device 100 can include multiple different branching mechanical waveguides 105, it can also include a compact mechanical waveguide transmission component that holds and moves the various branching mechanical waveguides 105 into place. The controller device can select a compact branching mechanical waveguide 105 based on the application and the output impact parameters.

The transmission component can include multiple branching mechanical waveguides 105 aligned in a single line, arranged in a curved or circular pattern, or otherwise arranged on the overall device. The transmission component can the controller device can identify or select a compact branching mechanical waveguide 105, and the compact mechanical waveguide impact device 100 can include a motor or actuator that slides, rotates, or otherwise moves the selected compact branching mechanical waveguide 105 into an 'active' waveguide location where the impacting components are aligned to impact the input impact locations. In some cases, the impacting components can also be moved using another motor or actuator to align with the input impact locations of the selected compact branching mechanical waveguide 105.

Whether the compact mechanical waveguide impact device 100 has a single branching mechanical waveguide 105 or multiple branching mechanical waveguide 105 in a transmission, the branching mechanical waveguide(s) 105 can be accessible through one or more access panels or other serviceable or service-enabling mechanisms of the mechanical waveguide impact device 100. The service-enabling mechanisms can include removable access panels such as hinged access panels or unhinged panels. The removable access panels can be closed and or affixed to a housing of the overall device using fasteners, such as screws, thumbscrews, clips, and other types of fasteners.

The service-enabling mechanisms can allow a user or technician to access a branching mechanical waveguide chamber or holder of the compact mechanical waveguide impact device 100, to remove and replace one or more the branching mechanical waveguide(s) 105 therein. Since the branching mechanical waveguides 105 can be subject to high forces and vibrations, as well as repeated and long duration usage, replacement of certain branching mechanical waveguides 105 through the service-enabling mechanisms can enable longevity of the overall device even if the branching mechanical waveguides 105 has a predetermined lifecycle that is shorter than that of the overall device. In some examples, the controller of the compact mechanical waveguide impact device 100 can track impacts, time of use, and other usage metrics, and can notify a user that the branching mechanical waveguides 105 should be replaced since a threshold time, number of impacts or other usage metric has been reached. The notification can include activation of a light on the device, emitting a sound from the device, a message transmission, and so on.

Figure 6A:
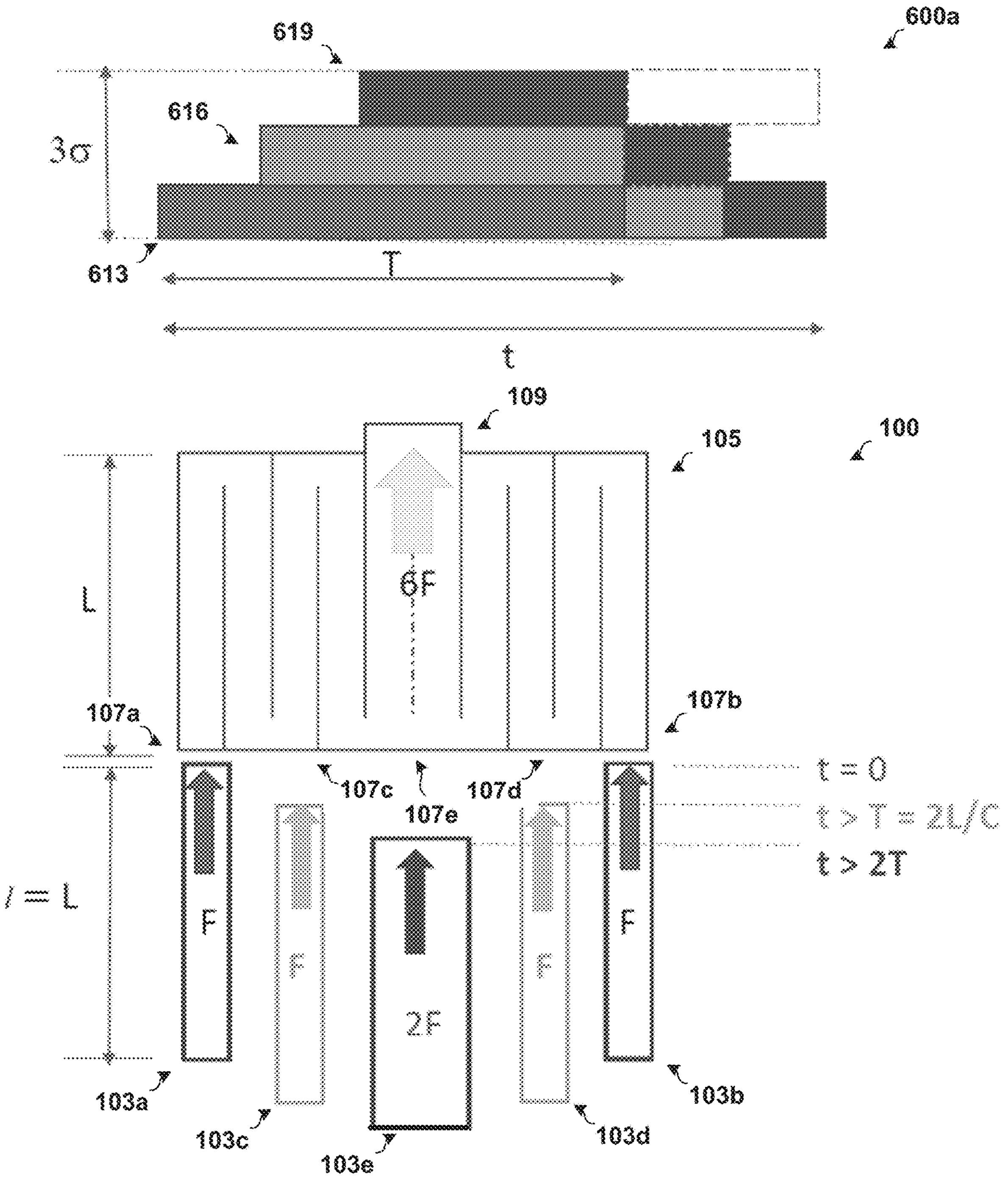
FIGS. 6A-6B illustrate examples of using multiple input impact components of a compact mechanical waveguide impact device to generate an output impact pattern, according to the present disclosure.

FIG. 6A shows a compact mechanical waveguide impact device 100 that includes multiple input impact components 103*a*-103*e* that strike at multiple input impact locations of a branching mechanical waveguide 105 to generate a desired output impact pattern 600*a* over time. The input impact components 103*a* and 103*b* can be synchronized in this example. The input impact components 103*a* and 103*b* can strike their corresponding input impact locations 107*a* and 107*b*, each of which can be at a same acoustic distance from the output impact point 109. The input impact components 103*c* and 103*d* can be synchronized and can strike corresponding input impact locations 107*c* and 107*d*, each of which can be at a same acoustic distance from the output impact point 109. The input impact locations 107*c* and 107*d* can be located at a shorter acoustic distance from the output impact point 109 compared with the input impact locations 107*a* and 107*b*. The input impact component 103*e* can strike corresponding input impact location 107*e*.

A controller device can control the compact mechanical waveguide impact device 100 to generate a particular output impact pattern 600*a* that ramps up from a first force level (corresponding to stress) to a maximum force level, then tapers back down to the first force level. In some cases, this can be a repeating pattern. The output impact pattern 600*a* can be selected and tuned for a particular object or material being impacted. The maximum force as well as the frequency of the output impact pattern 600*a* can be selected to prevent damage to the object or material, or to cause damage to the object or material being impacted while minimizing fatigue or strain on the operator and equipment. In some cases, the output impact pattern 600*a* can be impedance matched to the object to be impacted.

In this example, the input impact components 103*a* and 103*b* can strike first, causing a stress wave that propagates and produces an output impact pulse 613. The input impact components 103*c* and 103*d* can strike next, with a timing that causes the resulting output impact pulse 616 (and stress waves) to combine and overlap with the output impact pulse 613. The input impact component 103*e* can strike with a timing that causes the resulting output impact pulse 619 (and stress waves) to combine and overlap with the output impact pulses 613 and 616. The result is a force (and stress wave) that ramps up over time and then decreases according to the output impact pattern 600*a*.

In some cases, the desired output impact pattern 600*a* can ramp up, and maintain a maximum desired force for a predetermined time period, and then ramp down. The output impact pattern 600*a* can also ramp up to the maximum level, reduce down to an intermediate minimum, and stay within that range with a sinusoidal or other pattern for a predetermined time period, and then ramp down.

Figure 6B:
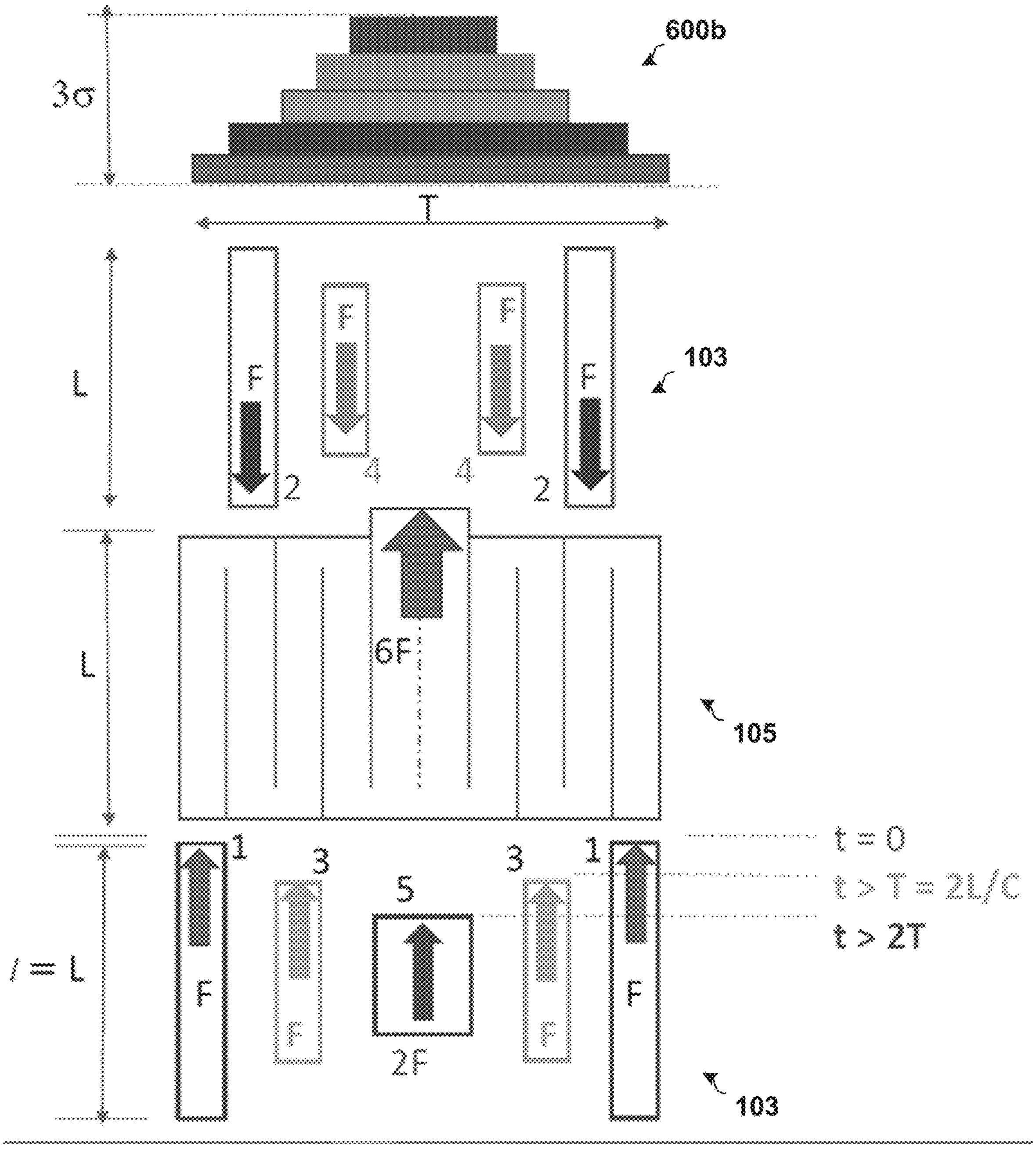

FIG. 6B shows a compact mechanical waveguide impact device 100 that includes multiple input impact components that strike at multiple input impact locations to generate a desired output impact pattern 600*b* over time. A controller device can control the compact mechanical waveguide impact device 100 to generate a particular output impact pattern 600*b* in a manner similar to that discussed in FIG. 6A. However, in this example, the input impact components 103 can strike various different impact locations on opposite sides of the branching mechanical waveguide 105 to create the desired output impact pattern 600*b*. This arrangement can result in a predetermined number of steps ramping up to the maximum force and stress level. The number of steps ramping up can be greater with this arrangement, if the same branching mechanical waveguide 105 is used.

A compact mechanical waveguide impact device 100 can include multiple different branching mechanical waveguides 105, and the controller device can control the input impact components to strike each branching mechanical waveguide 105 in multiple different ways, based on input parameters such as the object that is to be impacted, a maximum force, an intermediate minimum force, a frequency, and other parameters. These parameters can also be parameters corresponding to a desired output impact pattern 600*b*. In some examples, the maximum force, an intermediate minimum force, a frequency, and other parameters of the output impact pattern can be identified based on target parameters of the object to be impacted and a desired action (e.g., driving, drilling, demolition, etc.). The target parameters can include a material composition and shape of the object and material composition and shape of surrounding objects. The target parameters of the object and the desired action can be considered output impact parameters.

Since the compact mechanical waveguide impact device 100 can include multiple different branching mechanical waveguides 105, it can also include a compact mechanical waveguide transmission component that holds and moves the various branching mechanical waveguides 105 into place. The waveguide transmission component can be a manual transmission component that includes a handle and sliding or rotating track that can enable a user to manually move various branching mechanical waveguides 105 into place. The waveguide transmission component can be an automatic transmission component, where the controller device can select a compact branching mechanical waveguide 105 based on the application and the output impact parameters, and a motor or actuator can move the selected branching mechanical waveguides 105 into place using a sliding or rotating track on which the branching mechanical waveguides 105 are arranged.

The transmission component can include multiple branching mechanical waveguides 105 aligned in a single line, arranged in a curved or circular pattern, or otherwise arranged on the overall device. The controller device can identify or select a compact branching mechanical waveguide 105, and the compact mechanical waveguide impact device 100 can include a motor or actuator that slides, rotates, or otherwise moves the selected compact branching mechanical waveguide 105 into an 'active' waveguide location where the impacting components are aligned to impact the input impact locations. In some cases, the impacting components can also be moved using another motor or actuator to align with the input impact locations of the selected compact branching mechanical waveguide 105.

Figure 7:
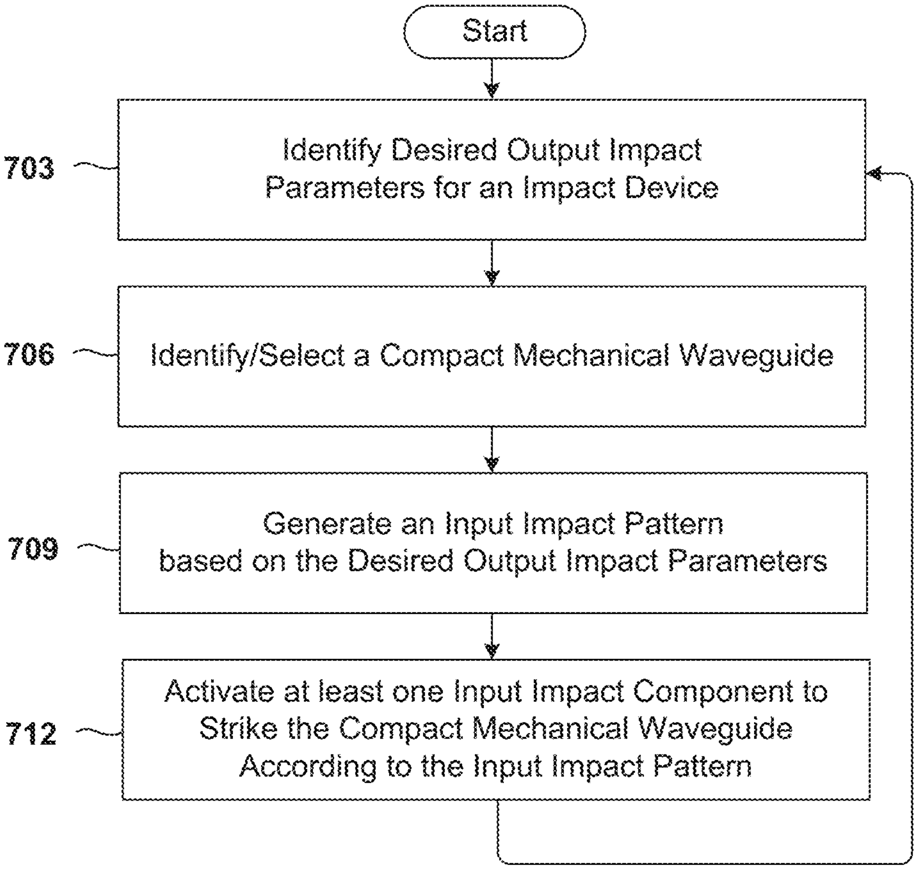
FIG. 7 illustrates a flowchart of a control operation for a compact mechanical waveguide impact device to generate an output impact pattern, according to the present disclosure.

FIG. 7 illustrates a flowchart of the operation of a controller device that controls one or more components of a compact mechanical waveguide impact device 100 to generate an output impact pattern.

In step 703, the controller device can identify a set of desired output impact parameters for the compact mechanical waveguide impact device 100. The output impact parameters can include target object parameters, a desired action, a maximum force, an intermediate minimum force, a frequency, a duration, and other parameters. The maximum force, intermediate minimum force, duration, and frequency can be output impact pulse parameters. In some cases, these can be selected or input manually by a user, and in other cases, the output impact pulse parameters can be calculated from the other output impact parameters such as target object parameters, and a desired action. In some cases, the actual output impact pattern can be manually selected. In other examples, the output impact pattern can be generated based on the various output impact parameters that are provided as inputs.

In step 706, the controller device can identify or select a compact branching mechanical waveguide 105. For example, the compact mechanical waveguide impact device 100 can include a compact mechanical waveguide transmission component with multiple branching mechanical waveguides 105, and the controller device can select a compact branching mechanical waveguide 105 based on the application and the output impact parameters. The transmission component can include multiple branching mechanical waveguides 105 aligned in a single line, arranged in a curved or circular pattern, or otherwise arranged on the overall device. The transmission component can the controller device can identify or select a compact branching mechanical waveguide 105, and the compact mechanical waveguide impact device 100 can include a motor or actuator that slides, rotates, or otherwise moves the selected compact branching mechanical waveguide 105 into an 'active' waveguide location where the impacting components are aligned to impact the input impact locations.

The controller device can generate or identify the output impact pattern, and select the compact branching mechanical waveguide 105 based on the output impact pattern. The controller device can also generate control signals to move the selected compact branching mechanical waveguide 105 into place, or can provide an indication on the overall device or wirelessly to a handheld, stationary, or other computing device that indicates which compact branching mechanical waveguide 105 is to be moved into place or installed into the compact mechanical waveguide impact device 100. Alternatively, the controller device can identify the compact branching mechanical waveguide 105 that is installed, available, or in place, and can generate the optimal output impact pattern that can be achieved using that compact branching mechanical waveguide 105.

In step 709, the controller device can generate an input impact pattern based on the desired output impact parameters. The controller device can generate the input impact pattern based on the output impact pattern that is selected or generated by the controller device as an intermediate calculation.

In step 712, the controller device can activate one or more input impact components of the compact mechanical waveguide impact device 100 to strike one or more impact locations of the compact branching mechanical waveguide 105 according to the input impact pattern. This can cause one or more output impact points of the compact branching mechanical waveguide 105 to produce the output impact pattern.

Figure 8:
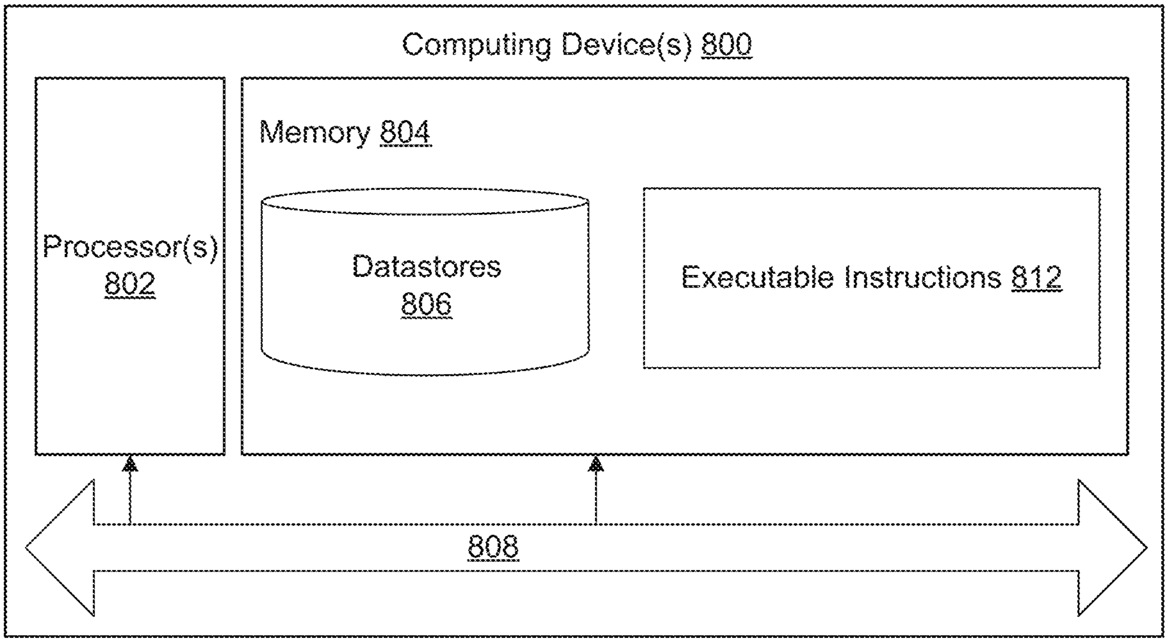
FIG. 8 illustrates an example computing device used for control operations and other operations of the compact mechanical waveguide impact device, according to various aspects of the embodiments of the present disclosure.

FIG. 8 illustrates an example computing device 800 used for any of the computational devices of the controllers and other devices utilized for the mechanisms described. The computing device 800 includes at least one processing system, for example, having a processor 802 and a memory 804, both of which are electrically and communicatively coupled to a local interface 808. The local interface 808 can be embodied as a data bus with an accompanying address/control bus or other addressing, control, and/or command lines, for data communications and addressing between the processor 802, the memory 804, and the executable instructions 812.

In various embodiments, the memory 804 stores data in a datastore 806 and other software or executable-code components executable by the processor 802. The datastore 806 can include data related to the operation of the compact mechanical waveguide impact device 100, and other data. Among others, the executable-code components of various computing devices 800 can include components associated with any of the functions described for the compact mechanical waveguide impact device 100, and an operating system for execution by the processor 802. Where any component discussed herein is implemented in the form of software, any one of a number of programming languages can be employed such as, for example, C, C++, C #, Objective C, JAVA®, JAVASCRIPT®, Perl, PHP, VISUAL BASIC®, PYTHON®, RUBY, FLASH®, or other programming languages.

The memory 804 stores software for execution by the processor 802. In this respect, the terms "executable" or "for execution" refer to software forms that can ultimately be run or executed by the processor 802, whether in source, object, machine, or other form. Examples of executable programs include, for example, a compiled program that can be translated into a machine code format and loaded into a random access portion of the memory 804 and executed by the processor 802, source code that can be expressed in an object code format and loaded into a random access portion of the memory 804 and executed by the processor 802, or source code that can be interpreted by another executable program to generate instructions in a random access portion of the memory 804 and executed by the processor 802, etc.

In various embodiments, the memory 804 can include both volatile and nonvolatile memory and data storage components. Volatile components are those that do not retain data values upon loss of power. Nonvolatile components are those that retain data upon a loss of power. Thus, the memory 804 can include, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 804.

The processor 802 can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the executable instructions 812 can represent one or more module or group of code that includes program instructions to implement the specified logical function(s) discussed herein. The program instructions can be embodied in the form of source code that includes human-readable statements written in a programming language or machine code that includes machine instructions recognizable by a suitable execution system, such as a processor in a computer system or other system. Thus, the processor 802 can be directed by execution of the program instructions to perform certain processes, such as those illustrated in the flowcharts described herein. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 802. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The flowcharts or process diagrams can be representative of certain methods or processes, functionalities, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 802. The machine code can be converted from the source code, etc. Further, each block can represent, or be connected with, a circuit or a number of interconnected circuits to implement a certain logical function or process step.

Although flowcharts can show a specific order of execution, it is understood that the order of execution can differ from that which is depicted. For example, the order of execution of two or more blocks can be scrambled relative to the order shown. The flowcharts can be viewed as depicting an example of a method implemented by a computing device. The flowchart can also be viewed as depicting an example of instructions executed in a computing device that includes one or more processor and one or more memory. Also, two or more blocks shown in succession can be executed concurrently or with partial concurrence. Further, in some embodiments, one or more of the blocks shown can be skipped or omitted. In addition, any number of counters, state variables, semaphores, or warning messages might be added to the logical flow described herein, for purposes of enhanced utility, accounting, performance measurement, or providing troubleshooting aids, etc. It is understood that all such variations are within the scope of the present disclosure.

Although the functionalities, services, programs, and computer instructions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, the functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described examples of the present disclosure are merely possible examples of implementations set forth for a clear understanding of the principles of the disclosure. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure and protected by the following claims.

Therefore, the following is claimed:

1. A compact waveguide impact device, comprising:

at least one input impact component that impacts a branching compact mechanical waveguide comprising at least one input impact location and at least one output impact point that is different from the at least one input impact location; and a controller device that activates the at least one input impact component to impact the at least one input impact location of the branching compact mechanical waveguide according to an input impact pattern, wherein impacting the at least one input impact location produces an output impact pattern at the at least one output impact point.

2. The compact waveguide of claim 1, wherein the at least one input impact location comprises input impact locations on opposite sides of the branching compact mechanical waveguide.

3. The compact waveguide of claim 1, wherein a single one of the at least one input impact component strikes a plurality of input impact locations of the at least one input impact location.

4. The compact waveguide of claim 1, further comprising a waveguide transmission comprising a plurality of branching compact mechanical waveguides including the branching compact mechanical waveguide.

5. The compact waveguide of claim 4, wherein the waveguide transmission is a manual waveguide transmission that enables manual movement of the branching compact mechanical waveguide into place.

6. The compact waveguide of claim 4, wherein the waveguide transmission is an automatic waveguide transmission, wherein the controller device selects the branching compact mechanical waveguide based on the output impact pattern and activates a component of the compact waveguide impact device to move the branching compact mechanical waveguide into place in the compact waveguide impact device.

7. The compact waveguide of claim 1, further comprising a serviceable mechanism that enables installation, removal, and replacement of the branching compact mechanical waveguide to the compact waveguide impact device.

8. A method, comprising:

impacting, using at least one input impact component, a branching compact mechanical waveguide comprising at least one input impact location and at least one output impact point that is different from the at least one input impact location; and activating, by a controller component, the at least one input impact component to impact the at least one input impact location of the branching compact mechanical waveguide according to an input impact pattern, wherein impacting the at least one input impact location produces an output impact pattern at the at least one output impact point.

9. The method of claim 8, wherein the at least one input impact location comprises input impact locations on opposite sides of the branching compact mechanical waveguide.

10. The method of claim 8, wherein a single one of the at least one input impact component strikes a plurality of input impact locations of the at least one input impact location.

11. The method of claim 8, wherein the branching compact mechanical waveguide is moved into place using a waveguide transmission comprising a plurality of branching compact mechanical waveguides including the branching compact mechanical waveguide.

12. The method of claim 11, wherein the waveguide transmission is a manual waveguide transmission that enables manual movement of the branching compact mechanical waveguide into place.

13. The method of claim 11, further comprising selecting, by the controller component, the branching compact mechanical waveguide based on the output impact pattern that is desired, wherein the waveguide transmission is an automatic waveguide transmission.

14. The method of claim 13, further comprising activating, by the controller component, a component of the compact waveguide impact device to move the branching compact mechanical waveguide into place in the compact waveguide impact device.

15. The method of claim 8, further comprising installing, removing, or replacing the branching compact mechanical waveguide in the compact waveguide impact device using a serviceable mechanism that enables access to a waveguide holder of the compact waveguide impact device.

* * * * *